United States Patent
Yamaguchi et al.

(10) Patent No.: US 10,189,110 B2
(45) Date of Patent: Jan. 29, 2019

(54) PLASMA CUTTING METHOD AND PLASMA CUTTING DEVICE

(71) Applicants: KOMATSU INDUSTRIES CORPORATION, Kanazawa-shi, Ishikawa (JP); KOMATSU LTD., Tokyo (JP)

(72) Inventors: Yoshihiro Yamaguchi, Kaga (JP); Satoshi Ohnishi, Komatsu (JP); Katsuo Saio, Hiratsuka (JP); Kazunori Tsunekawa, Hiratsuka (JP); Shigeo Morimoto, Yokohama (JP)

(73) Assignees: KOMATSU INDUSTRIES CORPORATION, Ishikawa (JP); KOMATSU LTD., Tokyo (JP)

( * ) Notice: Subject to any disclaimer, the term of this patent is extended or adjusted under 35 U.S.C. 154(b) by 1239 days.

(21) Appl. No.: 14/371,325

(22) PCT Filed: Mar. 7, 2013

(86) PCT No.: PCT/JP2013/056289
§ 371 (c)(1),
(2) Date: Jul. 9, 2014

(87) PCT Pub. No.: WO2013/146166
PCT Pub. Date: Oct. 3, 2013

(65) Prior Publication Data
US 2014/0353294 A1    Dec. 4, 2014

(30) Foreign Application Priority Data

Mar. 29, 2012  (JP) ................................. 2012-076094

(51) Int. Cl.
*B23K 9/00* (2006.01)
*B23K 10/00* (2006.01)
(Continued)

(52) U.S. Cl.
CPC ............ *B23K 10/00* (2013.01); *B23K 10/006* (2013.01); *B23K 37/0235* (2013.01); *B23K 2101/18* (2018.08); *B23K 2103/04* (2018.08)

(58) Field of Classification Search
CPC .. B23K 10/00; B23K 10/006; B23K 2201/18; B23K 2201/185; B23K 2203/00;
(Continued)

(56) References Cited

U.S. PATENT DOCUMENTS 6,914,209 B2 * 7/2005 Yamaguchi .......... B23K 10/006
219/121.39
2004/0129687 A1    7/2004 Yamaguchi et al.

FOREIGN PATENT DOCUMENTS

JP      7-88656 A      4/1995
JP      8-294778 A     11/1996
(Continued)

OTHER PUBLICATIONS

The International Search Report for the corresponding international application No. PCT/JP2013/056289, dated May 28, 2013.

*Primary Examiner* — Michael G Hoang
(74) *Attorney, Agent, or Firm* — Global IP Counselors, LLP

(57) ABSTRACT

A plurality of cutout members are cut out from a plate blank by a plasma arc generated from a plasma torch by a method including a piercing step and a cutting step. In the piercing step, an aperture is formed on an outer peripheral side of a cutout member by maintaining the plasma torch at a first height from the plate blank on the outer peripheral side of the cutout member while the plasma arc is generated from the plasma torch and by moving the plasma torch relative to the plate blank in a horizontal direction. In the cutting step, a continuous cutting groove is formed along an outer contour of the cutout member by setting the plasma torch at a second height lower than the first height and by moving the
(Continued)

plasma torch in the horizontal direction along an incision part and a processing line continuing to the incision part.

9 Claims, 17 Drawing Sheets

(51) Int. Cl.
*B23K 37/02* (2006.01)
*B23K 101/18* (2006.01)
*B23K 103/04* (2006.01)

(58) Field of Classification Search
CPC .......... B23K 2203/04; B23K 37/0235; B23K 37/0258; B23K 37/02; B23K 2101/18; B23K 2101/185; B23K 2103/00; B23K 2103/04; B23K 9/00
USPC .......... 219/121.39, 121.44, 121.54, 121.56, 219/121.59
See application file for complete search history.

(56) References Cited

FOREIGN PATENT DOCUMENTS

| | | |
|---|---|---|
| JP | 10-263856 A | 10/1998 |
| JP | 10-328841 A | 12/1998 |
| JP | 10-328842 A | 12/1998 |
| JP | 11-291048 A | 10/1999 |
| JP | 2004-195488 A | 7/2004 |
| JP | 2008-296243 A | 12/2008 |
| JP | 2010-12493 A | 1/2010 |
| JP | 2011-140055 A | 7/2011 |

* cited by examiner (a)
(PRIOR ART)

(b)

|  | INCISION LENGTH mm | INTER-PRODUCT DISTANCE mm |
|---|---|---|
| TORCH MOVEMENT DIRECTION = SAME DIRECTION AS FIRSTLY CUT-OUT SIDE | 20mm | 29mm (INCISION LENGTH + SPUTTER LENGTH) |
| TORCH MOVEMENT DIRECTION = PARALLEL DIRECTION TO FINALLY CUT-OUT SIDE | 10mm | 13.5 mm (INCISION LENGTH + 1/2 OF SPUTTER WIDTH) |
| WELL-KNOWN METHOD | 30mm | 42.5 mm (INCISION LENGTH + SPUTTER RADIUS) |

PLASMA CUTTING METHOD AND PLASMA CUTTING DEVICE

CROSS-REFERENCE TO RELATED APPLICATIONS

This application is a U.S. National stage application of International Application No. PCT/JP2013/056289, filed on Mar. 7, 2013. This U.S. National stage application claims priority under 35 U.S.C. § 119(a) to Japanese Patent Application No. 2012-076094, filed in Japan on Mar. 29, 2012, the entire contents of which are hereby incorporated herein by reference.

BACKGROUND

Field of the Invention

The present invention relates to a plasma cutting method, particularly to a plasma cutting method of cutting out a plurality of cutout members (hereinafter may be referred to as "products") from a plate blank (workpiece) by a plasma arc to be generated from a plasma torch.

Further, the present invention relates to a plasma cutting device for performing the plasma cutting method as described above.

Background Information

A welded structure, composing a main body frame of a bridge, a construction machinery, an industrial machinery or so forth, is obtained by cutting out variously shaped cutout members from a plate blank (workpiece). Plasma cutting, enabling arbitrarily shaped cutting based on a program, has been used in cutting out the cutout members as described above (see Japan Laid-open Patent Application Publication No. JP-A-2004-195488).

The following processing is performed in cutting out cutout members from a plate blank by means of plasma cutting.

First, the plate blank is pierced by a plasma jet ejected from a plasma torch (hereinafter may be simply referred to as "a torch") in a cutting start point (a piercing step). In the piercing step, the plasma jet penetrates through the plate blank from the front surface to the rear surface, and an aperture (hereinafter referred to as "a piercing aperture") is formed.

Thereafter, the torch is moved relatively to the plate blank in a horizontal direction, and thereby, a cutting groove is formed. Then, the torch is moved along the outer contour of a target cutout member, and the cutting groove is circulated once along the outer contour of the cutout member. Accordingly, the cutout member is cut out from the plate blank.

SUMMARY

In the piercing step of the plasma cutting as described above, the piercing aperture is formed in a distorted shape and has a size greater than a cutting width during cutting. To prevent deterioration of the shape of the cutout member attributed to the piercing aperture, a piercing point is set for forming the piercing aperture in a position outwardly separated away from the outer contour of the cutout member at a predetermined distance. On the other hand, immediately after a plasma arc is generated, electric current and gas are not stable. It takes roughly one second until stable cutting becomes available. Thus, it is required to provide an incision part in a zone from the piercing point to the outer contour as a run-up zone leading to stable cutting.

Further, a material, produced as a result of coagulation of a molten metal that has been melted and spouted until the plasma jet penetrates through the plate blank, attaches as a mound to the surrounding of the piercing aperture (the material will be hereinafter referred to as "a coagulated material", whereas the molten metal is termed as "dross" or "sputter" but it should be noted that the material produced as a result of coagulation of scattering molten metal may be also hereinafter referred to as "sputter"). The mound has a height of roughly 5 mm, and extends about the piercing aperture in a range of roughly the same as the plate thickness. On the other hand, a cutting height, which is the interval between the tip end of the torch and the surface of the plate blank in a cutting step, is roughly 5 mm. Therefore, in attempting to plasma-cut the surrounding of the piercing aperture to which the coagulated material of dross or sputter is attached, the torch collides with the coagulated material and the movement thereof is thus hindered. Even if the torch does not collide with the coagulated material, in actually cutting the coagulated material, the coagulated material negatively affects the cutting and the cutting surface of the cutout member becomes non-smooth. Therefore, it is required to set the length of the incision part to be greater than the range to which the coagulated material is attached.

Where a plurality of cutout members are laid out in and cut out from a plate blank, it is required to lay out every adjacent two of the cutout members through a wide interval due to the reasons as described above, i.e., the reason that the piercing point is required to be separated away from the outer periphery of the cutout member at a predetermined distance; and the reason that the incision part is required to reliably have a large length. Therefore, a ratio of the sum of the areas of the cutout members to the area of the plate blank, i.e., a throughput yield is reduced.

Now, laser cutting has been also used so far as a method of cutting out a cutout member as a welding structure from a plate blank.

However, in laser cutting, an aperture corresponding to a piercing aperture in plasma cutting is small (roughly 1 to 5 mm), and thus, such a technical problem in plasma cutting is not caused. On the other hand, in gas cutting, a piercing aperture is not as small as that formed in laser cutting; but the aperture diameter thereof is roughly half that in plasma cutting; and thus, such a technical problem in plasma cutting as described above is not caused.

As described above, in the well-known plasma cutting method, molten metal radially scatters to the surrounding of the piercing aperture. Therefore, the length of the incision part is inevitably increased, and the throughput yield is reduced.

In view of this, it can be assumed to tilt the torch to direct the scattering direction of molten metal to a predetermined direction. Alternatively, to achieve the same objective, it can be also assumed to blow away molten metal spouted by plasma cutting in a predetermined direction from a lateral side by compressed air or so forth.

However, in the method as described above, it is required to prepare a mechanism for tilting the torch or a nozzle mechanism for blowing away molten metal. Therefore, this becomes a factor of cost increase. Further, the scattering direction of molten metal depends on the tilt direction of the torch or the direction of the nozzle. Thus, it is required to add a mechanism for rotating the torch or the nozzle to cope with an arbitrary incision direction. In such a structural configuration, the construction of the torch and its periphery is inevitably complicated, and this becomes a factor of remarkable cost increase. Hence, this cannot be considered as a realistic solution.

It is an object of the present invention to improve a throughput yield in cutting out a plurality of cutout members from a plate blank by plasma cutting, and especially, to improve a throughput yield that is to be reduced due to a piercing step.

Solution to Problems

A plasma cutting method according to a first aspect of the present invention is a method of cutting out a plurality of cutout members from a plate blank by a plasma arc to be generated from a plasma torch, and includes a piercing step and a cutting step. In the piercing step, an aperture is formed on an outer peripheral side of a given one of the cutout members by maintaining the plasma torch at a first height from the plate blank on the outer peripheral side of the given cutout member while the plasma arc is being generated from the plasma torch and by moving the plasma torch relatively to the plate blank by a predetermined distance in a horizontal direction. In the cutting step, a continuous cutting groove is formed along an outer contour of the given cutout member by setting the plasma torch at a second height lower than the first height and by moving the plasma torch in the horizontal direction along an incision part and a processing line continuing to the incision part.

According to the present method, unlike the well-known method of forming a piercing aperture with the plasma torch being fixed at the piercing point, a piercing aperture is configured to be formed in the piercing step by maintaining the plasma torch at the first height while the plasma arc is being generated from the plasma torch and by moving the plasma torch relatively to the plate blank in the horizontal direction.

As illustrated in a schematic diagram of FIG. 1, in the piercing step of the well-known method, metal melted by a plasma jet is spouted up. The molten metal radially expands. Specifically, in the well-known method of forming a piercing aperture with the plasma torch being fixed, the piercing aperture concentrically expands from the piercing point and becomes a relatively large aperture that is double to triple the width of a cutting groove.

By contrast, according to an experiment conducted by the inventor of the present invention, it was found as illustrated in FIG. 2 that when a piercing aperture is configured to be formed while the plasma torch is moved in the horizontal direction, scattering of molten metal can be controlled to have a predetermined directivity without tilting the plasma torch or providing a nozzle for blowing up molten metal.

Further, it was found that in the present method, a piercing aperture with a diameter roughly the same as the width of a cutting groove can be formed by moving the plasma torch in an incision direction by a distance that is roughly half the plate thickness of the plate blank. Yet further, it was also found that a coagulated material as a result of coagulation of molten metal attached to a range of width roughly double the width of a cutting groove in the opposite direction to the incision direction and the amount of attachment of the coagulated material could be reduced to roughly half the plate thickness of the plate blank. When described in more detail, molten metal normally attaches in a petal shape in all directions to a range about the piercing point with a radius of roughly half the plate thickness. However, it was found that in the technical method of the present invention, molten metal attached in a snap shape in the opposite direction to the incision direction to a range that extends from the piercing point and has a width of roughly double the cutting width and a length of roughly half the plate thickness, and as a result, the amount of attachment was reduced to half.

In view of the above, according to the present invention, in the piercing step, a piercing aperture is configured to be formed while the plasma torch is moved relatively to the plate blank in the horizontal direction. With the method, the amount of sputter and dross as the molten metal can be inhibited in comparison with the well-known method; and in cutting out a plurality of cutout members from the plate blank, the interval between every adjacent two of the cutout members can be narrowed. Therefore, a throughput yield can be improved.

Further, in the piercing step, processing is performed by moving the plasma torch in the horizontal direction by a predetermined distance while the plasma torch is maintained at the first height. Therefore, in the region with the predetermined distance, processing can be performed under processing conditions suitable for minimizing reduction in throughput yield in accordance with a variety of specifications (the plate thickness and the material) of the plate blank.

A plasma cutting method according to a second aspect of the present invention relates to the method of the first aspect, and wherein a movement speed of the plasma torch in the piercing step and a movement speed of the plasma torch in the cutting step are separately settable.

In the well-known plasma cutting method, the movement speed of the plasma torch in the horizontal direction is set to be a speed optimized for obtaining better cutting quality. Therefore, the speed is a speed optimized for cutting, but is not a speed optimized for the piercing step. For example, the horizontal movement speed in the cutting step is normally set to be roughly 1700 mm/min, although the horizontal movement speed in the piercing step should be roughly 2000 mm/min.

In view of the above, according to the method of the second aspect, the movement speed of the plasma torch in the piercing step and that in the cutting step are separately settable to optimize the movement speeds of the plasma torch in the respective steps.

According to the method as described above, the movement speed can be optimized for a variety of piercing steps, and scattering of sputter can be further inhibited.

A plasma cutting method according to a third aspect of the present invention relates to the method of the first or second aspect, and wherein in the piercing step, the plasma torch is configured to be moved in a direction along a finally cut-out one of sides of the given cutout member.

According to the cutting method as described above, it is possible to reduce a space (i.e., a wasted region) of the incision part to be formed between every adjacent two of the cutout members in the plate blank. Therefore, the throughput yield can be further improved.

A plasma cutting method according to a fourth aspect of the present invention relates to the method according to any of the first to third aspects, and wherein in the piercing step, the plasma torch is set at a height lower than the first height when the plasma arc begins to be generated, and is then moved in the horizontal direction while being moved in an upward direction to the first height.

According to the method, in the piercing step, the plasma torch is set at the position lower than the first height when the plasma arc begins to be generated, and is then elevated to the first height while being moved in the horizontal direction.

Here, the plasma arc begins to be generated at a lower position. Hence, transition from a pilot arc to a main arc can be smoothly performed. Therefore, it is possible to alleviate damage of the nozzle of the plasma torch attributed to the pilot arc, and thus to extend the life of the nozzle.

A plasma cutting method according to a fifth aspect of the present invention relates to the method of the fourth aspect, and wherein an upward movement speed of the plasma torch in the piercing step is set to be the fastest among the movement speeds in all the steps.

In the piercing step, sputter can be further inhibited from attaching to the plasma torch by quickly elevating the plasma torch.

A plasma cutting device according to a sixth aspect of the present invention is the one configured to cut out a plurality of cutout members from a plate blank, and includes a mount plate, a plasma torch and a control unit. The mount table is a member onto which the plate blank to be cut is mounted. The plasma torch is configured to generate a plasma arc and be movable relative to the mount table in a horizontal direction and an up-and-down direction. The control unit is configured to control movement of the plasma torch relative to the mount table and generation of the plasma arc from the plasma torch. Further, the control unit includes a processing line data obtaining part that is configured to receive a set of data regarding a processing line, a piercing function part, and a cutting function part. The piercing function part is configured to form an aperture on an outer peripheral side of a given one of the cutout members by maintaining the plasma torch at a first height from the plate blank on the outer peripheral side of the given cutout member while the plasma arc is being generated from the plasma torch and by moving the plasma torch relative to the plate blank by a predetermined distance in a horizontal direction. The cutting function part is configured to form a continuous cutting groove along an outer contour of the given cutout member by setting the plasma torch at a second height lower than the first height and by moving the plasma torch in the horizontal direction along an incision part and the processing line continuing to the incision part.

According to the present device, a piercing aperture is formed while the plasma torch is moved relatively to the plate blank in the horizontal direction. It is thereby possible to inhibit the amount of sputter to be generated in forming the piercing aperture in comparison with the well-known device. Thus, when the plural cutout members are cut out from the plate blank, the interval between every adjacent two of the cutout members can be narrowed, and accordingly, the throughput yield can be improved.

A plasma cutting device according to a seventh aspect of the present invention relates to the device of the sixth aspect, and wherein the control unit is capable of separately setting a movement speed of the plasma torch in the piercing function part and a movement speed of the plasma torch in the cutting function part.

According to the present device, it is possible to separately set the movement speed of the plasma torch in forming a piercing aperture and that in cutting a given one of the cutout members along the outer contour thereof. Accordingly, in both forming a piercing aperture and cutting the outer contour of the given one of the cutout members, optimal cutting can be performed in accordance with conditions such as the sort of the plate blank and the shape of the cutout member.

A plasma cutting device according to an eighth aspect of the present invention relates to the device of the sixth or seventh aspect, and wherein the control unit is configured to perform a processing of causing the piercing function part to move the plasma torch in a direction along a finally cut-out one of sides of the given cutout member on a basis of the set of data obtained in the processing line data obtaining part.

Here, it is possible to reduce a space of the incision part to be formed between every adjacent two of the cutout members in the plate blank, and thus to further improve the throughput yield.

A plasma cutting device according to a ninth aspect of the present invention relates to the device according to any of the sixth to eighth aspects, and wherein the control unit is configured to perform a processing of causing the piercing function part to set the plasma torch at a position lower than the first height when the plasma arm begins to be generated, and then move the plasma torch in the horizontal direction and simultaneously in an upward direction to the first height.

Here, the plasma arc begins to be generated at a lower position. Hence, transition from a pilot arc to a main arc can be smoothly performed. Therefore, it is possible to alleviate damage of the nozzle of the plasma torch attributed to the pilot arc, and thus to extend the life of the nozzle.

According to the present invention as described above, it is possible to improve a throughput yield in cutting out a plurality of cutout members from a plate blank by of plasma cutting. Especially, it is possible to improve a throughput yield that is to be reduced due to a piercing step.

BRIEF DESCRIPTION OF THE DRAWINGS

FIG. 14 is a table representing comparison in inter-product distance among the examples of FIGS. 11 to 13.

DESCRIPTION OF EXEMPLARY EMBODIMENTS

Structure of Plasma Cutting Device

Figure 1:
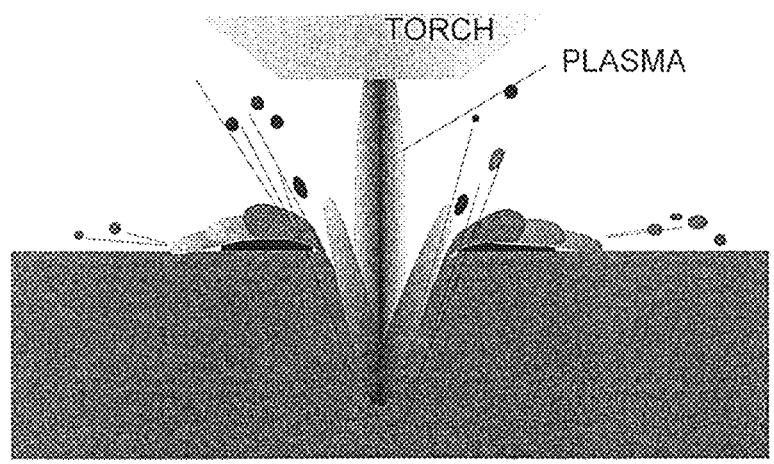
FIG. 1 is a diagram schematically illustrating a scattering condition of molten metal where a piercing step is performed with a well-known method.
Figure 2:
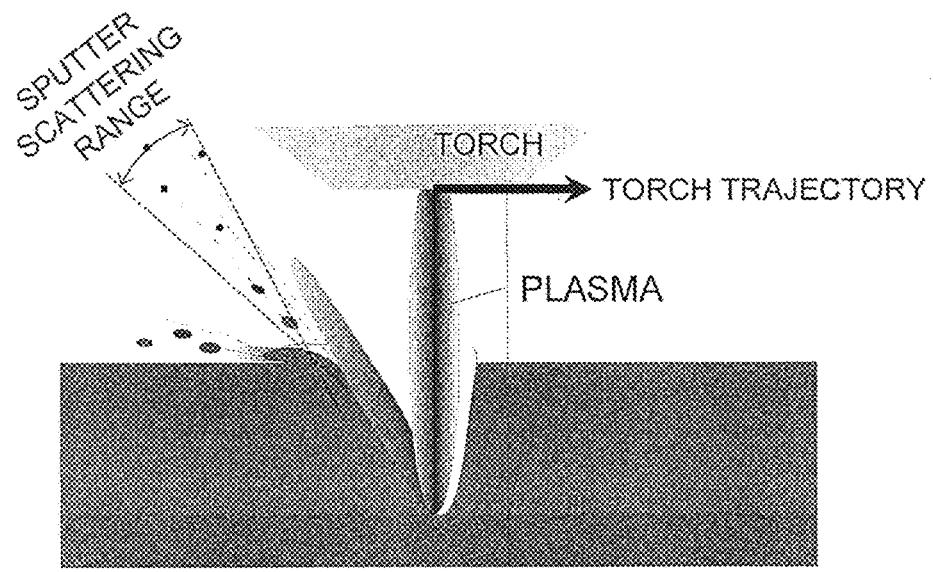
FIG. 2 is a diagram corresponding to FIG. 1 where a piercing step is performed with a method of the present invention.
Figure 3:
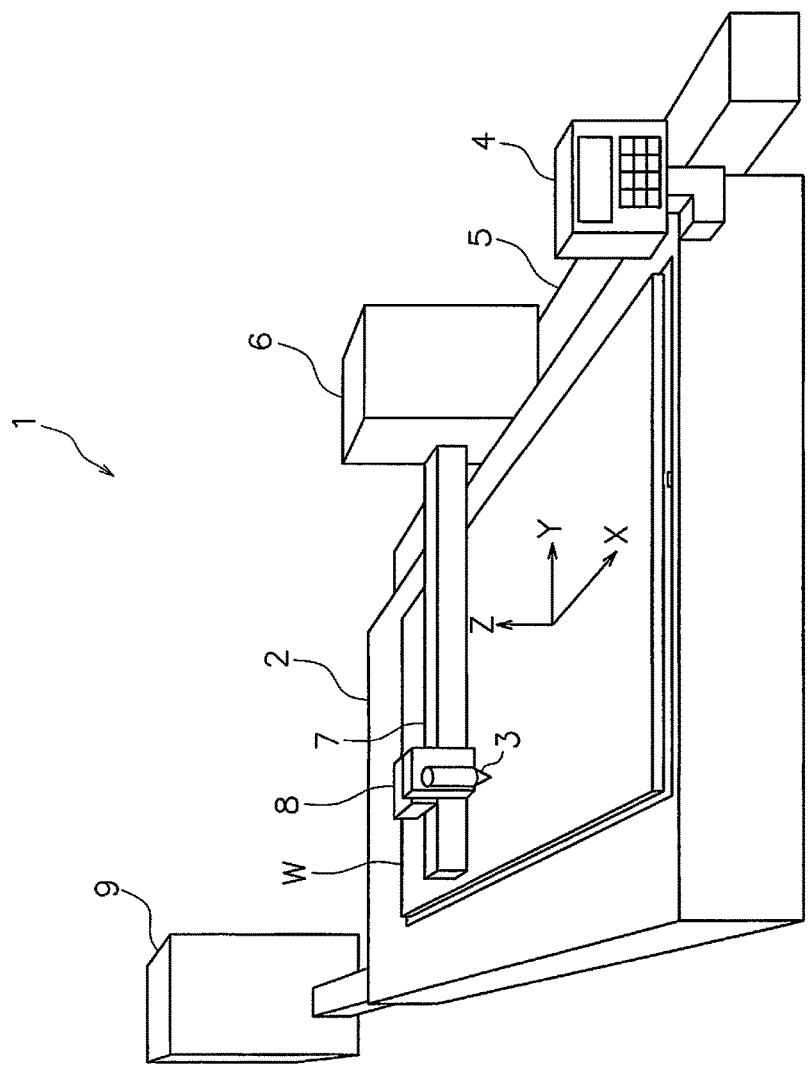
FIG. 3 is an external structural view of a plasma cutting device according to an exemplary embodiment of the present invention.

FIG. 3 illustrates an entire structure of a plasma cutting device 1 according to an exemplary embodiment of the present invention. The plasma cutting device 1 includes a mount table 2 onto which a steel plate W provided as a plate blank (workpiece) is mounted, a plasma torch 3, and a controller 4.

An X-axis guide member 5 is disposed laterally to the mount table 2. A movable truck 6 is supported by the X-axis guide member 5 while being movable in an X-axis direction. A Y-axis guide member 7 is fixed to the movable truck 6, while extending in a Y-axis direction perpendicular to the X-axis direction. The Y-axis guide member 7 is located over the mount table 2.

The plasma torch 3 is mounted to a carriage 8 supported by the Y-axis guide member 7. The carriage 8 is movable in the Y-axis direction along the Y-axis guide member 7. Further, the plasma torch 3 is movable in a Z-axis direction (an up-and-down direction) with respect to the carriage 8. The plasma torch 3 is formed in a roughly cylindrical shape and has a tapered tip end part. The plasma torch 3 is connected to a plasma power source unit 10 (see FIG. 4) through a torch cable and so forth.

With the aforementioned structure, the plasma torch 3 is enabled to be moved to an arbitrary position in the horizontal direction (the X-axis and Y-axis directions) and the up-and-down direction (the Z-axis direction) with respect to the plate blank W mounted on the mount table 2.

It should be noted that a dust collection device 9, configured to trap and collect powder dust spouted to the downward of the mount table 2, is disposed laterally to the mount table 2.

Figure 4:
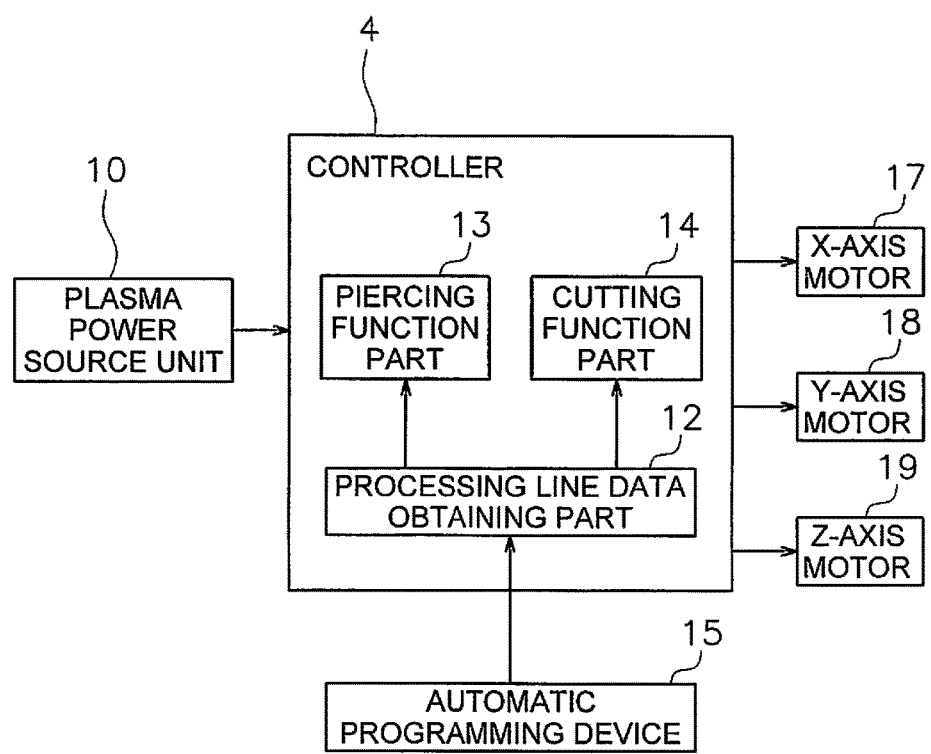
FIG. 4 is a diagram representing a configuration of a control system of the plasma cutting device.

As represented in FIG. 4, the controller 4 includes a processing line data obtaining part 12, a piercing function part 13 and a cutting function part 14. It should be noted that the piercing function part 13 and the cutting function part 14 are implemented by a program.

Figure 5:
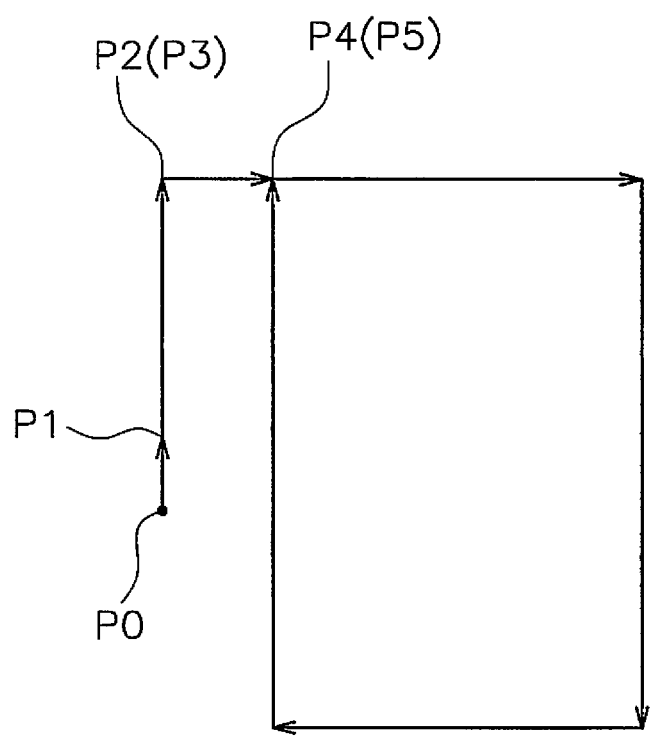
FIG. 5 is a diagram illustrating an exemplary processing line according to the exemplary embodiment of the present invention.

An automatic programming device 15 is connected to the controller 4. The automatic programming device 15 is a device configured to program a set of data regarding a processing line as illustrated in FIG. 5, for instance, in accordance with the shape of a cutout member. The set of processing data, programmed by the automatic programming device 15, is transmitted to the processing line data obtaining part 12 of the controller 4. Further, an X-axis motor 17 for moving the movable truck 6 in the X-axis direction, a Y-axis motor 18 for moving the carriage 8 in the Y-axis direction and a Z-axis motor 19 for moving the plasma torch 3 in the Z-axis direction are connected to the controller 4. Yet further, the plasma power source unit 10 is connected to the controller 4, and generation of a plasma arc is thereby configured to be controlled.

Plasma Cutting Method

Figure 6:
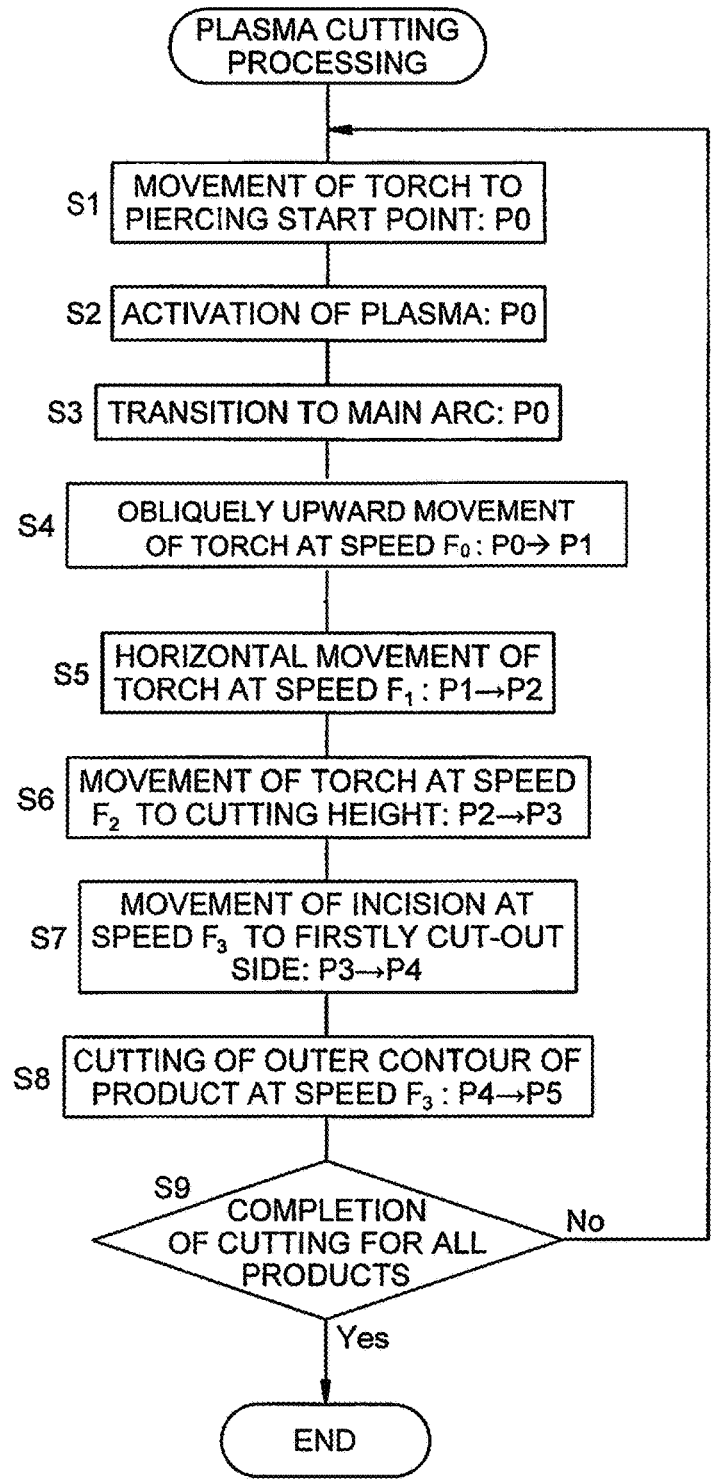
FIG. 6 is a chart representing a processing procedure in a processing method according to the exemplary embodiment of the present invention.
Figure 7:
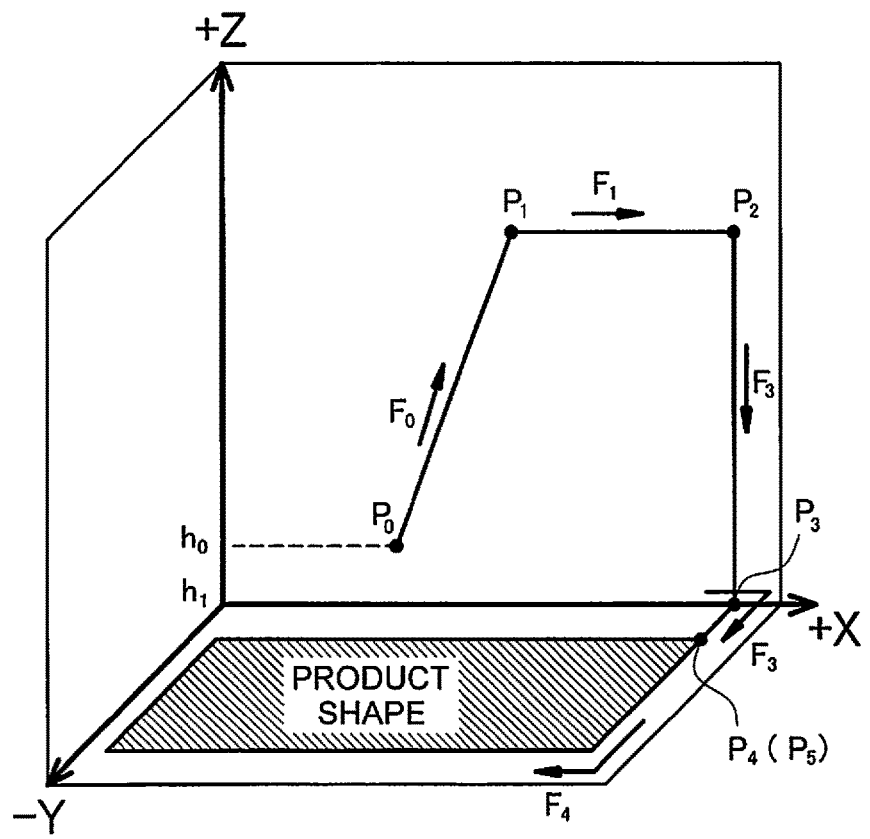
FIG. 7 is a diagram illustrating a trajectory and a speed of a plasma torch according to the exemplary embodiment of the present invention.
Figure 8:
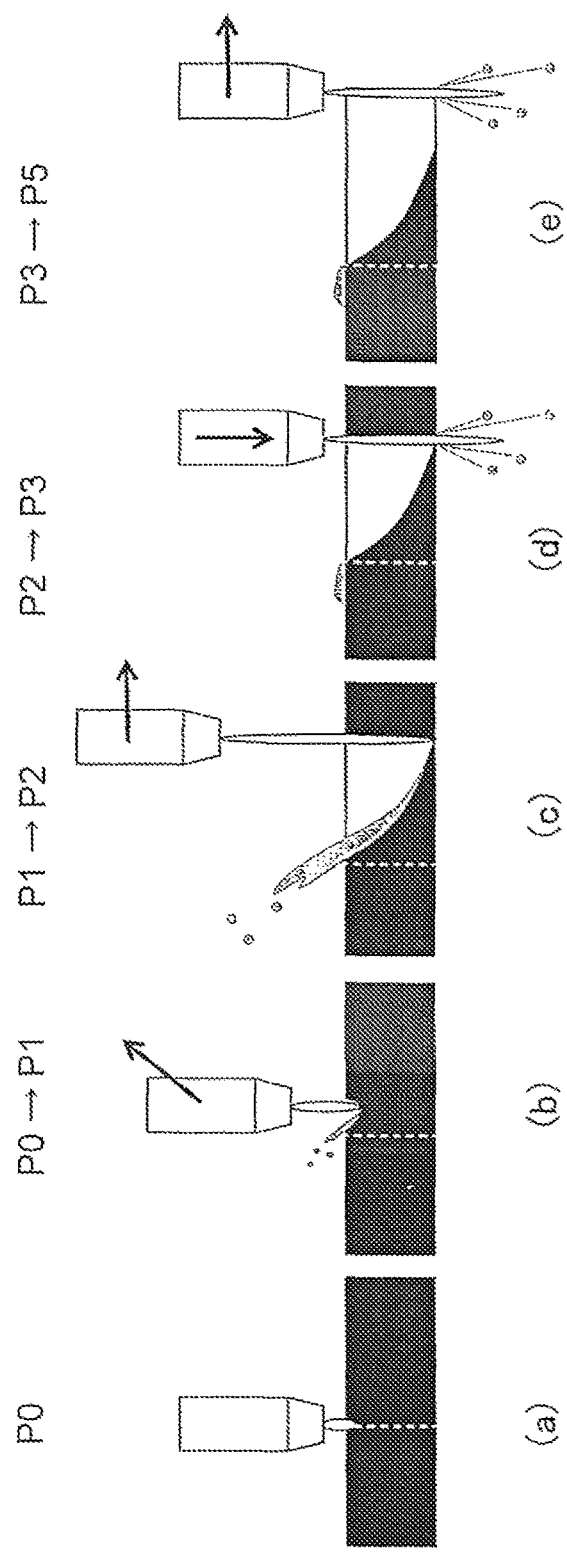
FIGS. 8(a)-8(e) include diagrams schematically illustrating the plasma torch and a plate blank when the processing procedure in FIG. 6 is performed.

Using FIGS. 5 to 8, explanation will be made for a cutting method to be performed by the aforementioned plasma cutting device 1. FIG. 5 is a plan view of a movement trajectory of the plasma torch 3. FIG. 6 represents a procedure in the cutting method, whereas FIG. 7 represents a movement trajectory and a movement speed of the plasma torch. Further, FIG. 8 is a diagram schematically illustrating movement of the plasma torch and cutting conditions of the plate blank. It should be noted that positions P0 to P5 respectively correspond to those represented in FIGS. 5 and 7.

The plasma cutting method is characterized in the following points.

First, the plasma torch 3 is horizontally moved while being upwardly moved from the start point P0 in the piercing step to the position P1 (it should be noted that only the horizontal movement is applicable without the upward movement).

Second, processing is performed from the position P1 to the position P2 under the same processing condition while the same height (a first height) is maintained.

Third, the plasma torch 3 is moved from the position P0 to the position P2 in parallel to a finally cut-out one of the sides of a cutout member (i.e., in the X-axis direction).

Fourth, a zone from the position P3 to the position P4 is set as a run-up zone. In the run-up zone, processing is performed under the same condition as cutting of the cutout member. A processing condition is thereby stabled until the plasma torch 3 reaches the position P4.

Explanation will be hereinafter made for a cutting method on the basis of FIG. 6.

In Step S1, as illustrated in FIG. 8(a), the plasma torch 3 is firstly moved to and positioned in the start point P0 in the piercing step. It should be noted that the X-axis directional position and the Y-axis directional position of the start point P0 have been preliminarily set. Further, the Z-axis directional position (i.e., the height position) of the start point P0 is determined by detecting the height position of the plate blank. The height position of the plate blank is detected with use of a height detection sensor. Alternatively, the height position of the plate blank can be also detected by contacting the tip end of the plasma torch 3 to the plate blank.

The height of the start point P0 is herein set to be equal to or roughly equal to the cutting height that is a distance between the plasma torch 3 and the plate blank where cutting is performed, or alternatively, is set to be a height that is closer to the plate blank than the cutting height and does not cause a double arc (i.e., abnormal discharge).

With the height setting as described above, transition from a pilot arc to a main arc is enabled with a small pilot current. Further, in the plasma torch 3, a difference is reduced between an electric resistance in a discharge channel between an electrode and a nozzle and that in a discharge channel between the electrode and the processing workpiece. Hence, transition from the pilot arc to the main arc can be smoothly performed. Therefore, the degree of erosion and damage of the nozzle of the plasma torch 3 attributed to the pilot arc can be alleviated, and thus, the life of the nozzle can be extended by inhibiting deterioration of the nozzle.

Next in Step S2, plasma is activated in the start point P0. In other words, the pilot arc is generated by feeding plasma gas to the plasma torch 3 and by applying high voltage to the electrode of the plasma torch 3. Then in Step S3, transition from the pilot arc to the main arc is performed. In other words, transition from the pilot arc to the main arc is performed by causing the pilot arc to reach the plate blank.

Next in Step 4, as illustrated in FIG. 8(*b*), the plasma torch 3 is moved obliquely upward at a speed F0 from the start position P0 to the position P1 set as the first height in the Z direction. It should be noted that the speed F0 is the fastest among the speeds in all the steps.

With the movement from the position P0 to the position P1 as described above, upwardly scattering spatter can be inhibited from attaching to the nozzle of the plasma torch 3. Thus, damage of the nozzle attributed to sputter can be avoided.

In Step S5, as illustrated in FIG. 8(*c*), the plasma torch 3 is horizontally moved from the position P1 to the position P2, while the height thereof is maintained at the first height. The movement speed of the plasma torch 3 is herein set to be a speed F1.

The first height of the positions P1 and P2 in Step S5 is set to be optimal for enabling better processing of the piercing aperture in accordance with conditions such as the material and the thickness of the plate blank. Further, other processing conditions such as the movement speed and current are also set to be optimal for the plate blank from the position P1 to the position P2. The position P2 is a point indispensable for setting the optimal processing conditions in the piercing step. Further, the distance from the position P1 to the position P2 corresponds to the distance of the piercing aperture bored until the plate blank is penetrated.

Next in Step S6, as illustrated in FIG. 8(*d*), the height position of the plasma torch 3 is lowered from the position P2 to the position P3 set as a second height position, while the horizontal position of the plasma torch 3 is maintained. The lowered position P3 corresponds to the height in performing cutting. The position P3 is the same position as a firstly cut-out one of the sides of the cutout member in the X-axis direction.

In Steps S7 and S8, as represented in FIG. 8(*e*), while the speed of the plasma torch 3 is maintained at a speed F3, cutting of the cutout member is started from the position P4; the plasma torch 3 is then continuously moved along the outer periphery of the cutout member; and thus, cutting of the single cutout member is finished in the position P5.

A zone from the position P3 to the position P4 is herein an incision part, and serves as a run-up zone leading to the beginning of cutting of the cutout member as a product. In the run-up zone, the processing conditions are set to be completely the same as the conditions in cutting the cutout member. With the run-up zone thus provided, the cutout member can be processed from the cutting start point P4 in a stable processing state.

Further in Step S7, when it comes to the timing that the gas flow rate, the current value and the cutting speed as the processing conditions become suitable for cutting, a voltage value of the plasma arc at this point is retrieved. Thereafter, the retrieved voltage value is set as a target voltage value in Steps S7 and S8. In other words, in Steps S7 and S8, the arc voltage is detected as a signal of height information, and the Z-axis directional position (the height position) of the plasma torch is controlled, such that the arc voltage can be the target voltage.

In Step S9, it is determined whether or not cutting of all the cutout members laid out in the plate blank has been finished. When cutting of all the cutout members has not been finished yet, the processing returns to Step S1 from Step S9, and the aforementioned processing is repeatedly performed. By contrast, when cutting of all the cutout members has been finished, the plasma cutting processing is ended.

Comparison in Piercing Step and Throughput Yield

Explanation will be made in detail for advantageous effects achieved by the aforementioned configuration where the piercing step is performed while the plasma torch 3 is moved in the horizontal direction and for those achieved by the aforementioned configuration where the piercing step is performed while the plasma torch 3 is moved in parallel to the finally cut-out side of a cutout member.

Figure 9:
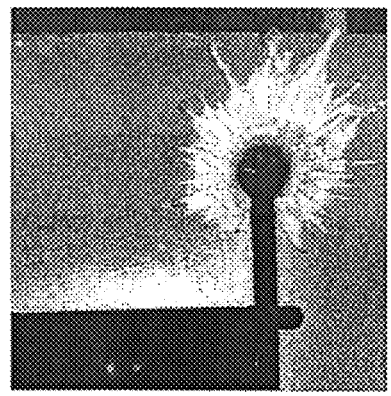
FIGS. 9A and 9B include graphics respectively showing a scattering condition of molten metal (an attachment condition of a coagulated material) with use of the well-known method and that with use of the method of the present invention.
Figure 9:
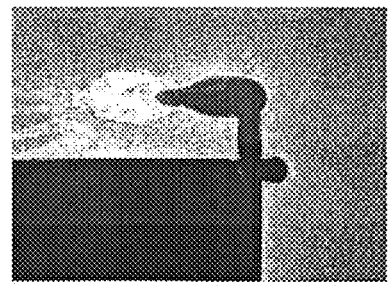

FIG. 9(*a*) shows a situation that a piercing aperture is formed in a well-known piercing step, whereas FIG. 9(*b*) shows a situation that a piercing aperture is formed in a piercing step according to the exemplary embodiment of the present invention.

As is obvious from these photographs, in the well-known method shown in FIG. 9(*a*), molten metal has radially scattered to the surrounding of the piercing aperture, and has coagulated and attached as a coagulated material in a wide range. Therefore, it is required to extend the interval between every adjacent two of the cutout members. By contrast, in the method of an exemplary embodiment of the present invention shown in FIG. 9(*b*), a coagulated material has extended in an elongated shape in the upstream of the movement direction of the plasma torch (i.e., opposite to the movement direction). However, it is obvious that the width of the extending coagulated material is narrower than that in the well-known method.

Experimental Example 1

Figure 10:
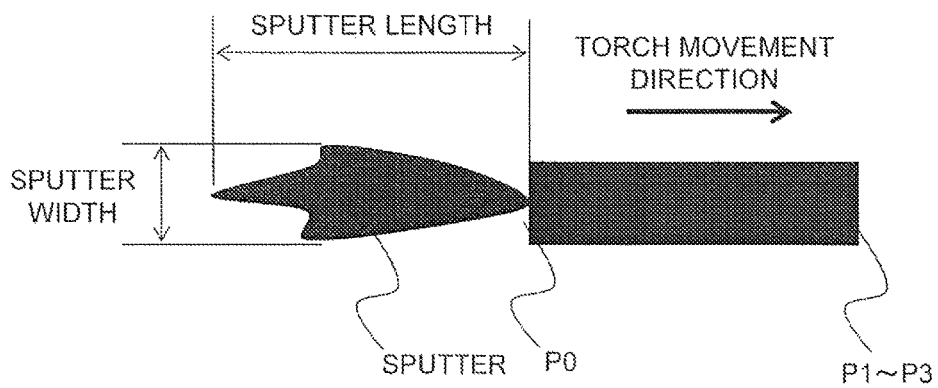
FIG. 10 is a diagram illustrating the length and the width of a coagulated material (represented as "sputter" in the drawing) where a piercing step is performed by moving the plasma torch.

FIG. 10 shows an experimental example that a piercing aperture was formed in a plate blank with a thickness of 25 mm with use of the method of the present invention. As is obvious from the experimental example, it is understood that the width and the length of a sputter as a coagulated material was quite less than the thickness of the plate blank. Although not shown in the drawing, where a piercing aperture was formed in a plate blank with a thickness of 25 mm with use of the well-known method, the radius of a coagulated material attached about the piercing point was 25 mm. By contrast, as shown in FIG. 10, where the piercing aperture was formed with use of the method of an exemplary embodiment of the present invention, the length of the sputter as a coagulated material was 9 mm on average while the width of the sputter was 7 mm on average.

Experimental Example 2

Inter-Product Comparison

Figure 11:
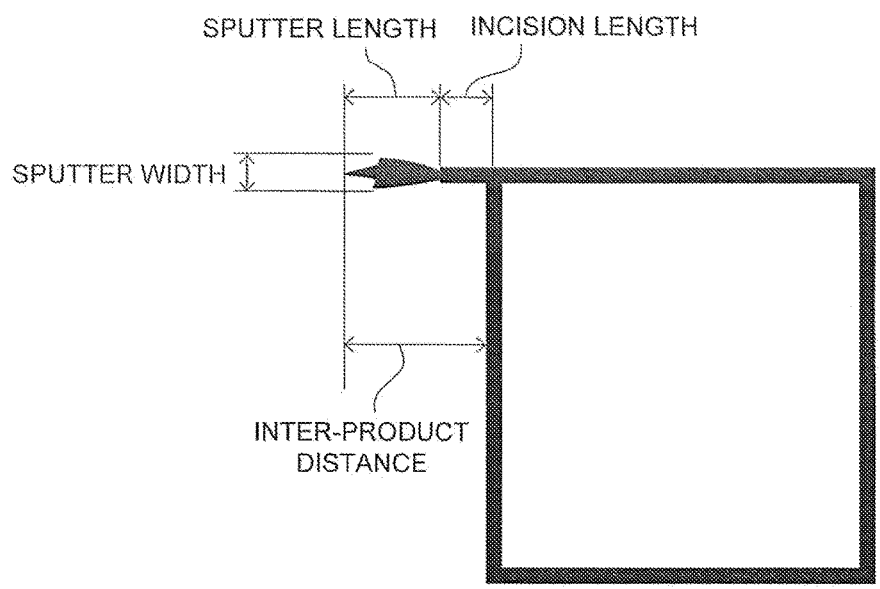
FIG. 11 is a diagram illustrating a coagulated material (represented as "sputter" in the drawing) and a movement trajectory of the plasma torch according to another exemplary embodiment of the present invention.
Figure 12:
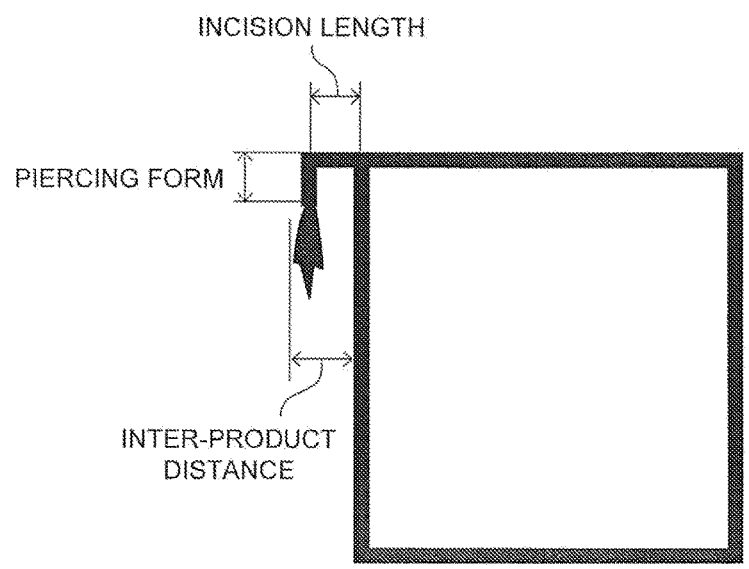
FIG. 12 is a diagram illustrating a coagulated material and a movement trajectory of the plasma torch according to the example of FIGS. 5 to 8.
Figure 13:
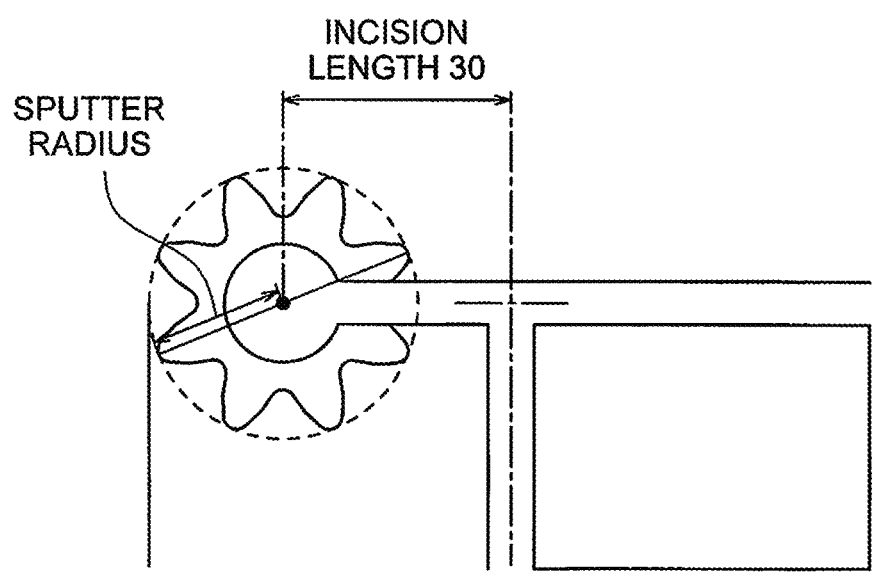
FIG. 13 is a diagram illustrating a coagulated material (represented as "sputter" in the drawing) and a movement trajectory of the plasma torch with use of the well-known method.

FIGS. 11 to 13 illustrate difference between an inter-product distance with use of the cutting method of an exemplary embodiment of the present invention (FIGS. 11 and 12) and that with use of the well-known cutting method (FIG. 13). FIG. 11 relates to where the plasma torch was moved in the same direction as the firstly cut-out side of a cutout member in the piercing step. FIG. 12 relates to where the plasma torch was moved in parallel to the finally cut-out side of a cutout member in the piercing step.

FIG. 14 represents incision lengths and inter-product distances with use of the respective aforementioned methods. As is obvious from the experiment, it is understood that the inter-product distance could be remarkably reduced especially when the movement direction of the plasma torch is set to be in parallel to the finally cut-out side of a cutout member in the piercing step.

Layout of Cutout Members

Similarly, as is obvious from the aforementioned experimental examples, due to difference in the extended state of molten metal, i.e., the coagulated material as a result of coagulation of the molten metal, the method of an exemplary embodiment of the present invention can much reduce a wasted region of the plate blank material in comparison with the well-known method. FIGS. 15 to 18 illustrate differences among wasted regions to be produced when a plurality of cutout members are cut out from the plate blank.

Figure 15:
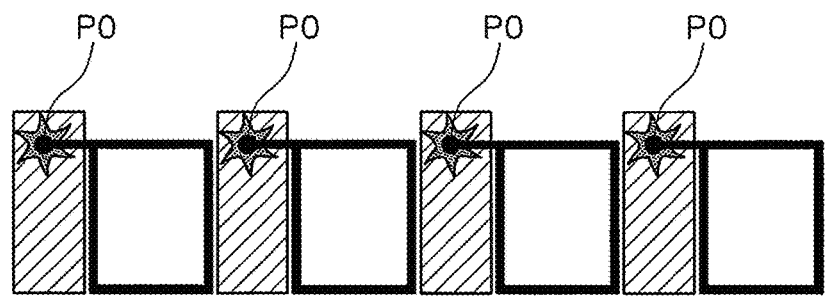
FIG. 15 is a diagram illustrating an exemplary product alignment where a piercing step is performed with use of the well-known method.
Figure 16:
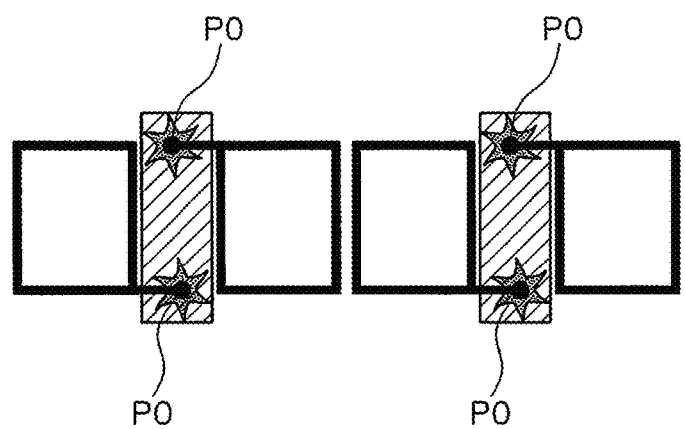
FIG. 16 is a diagram illustrating another exemplary product alignment where a piercing step is performed with use of the well-known method.

FIG. 15 illustrates where a plurality of cutout members are cut out with use of the well-known method. In the well-known method, as described above, molten metal and the coagulated material thereof are extended in a wide range. Therefore, it is required to reliably set a wide interval between every adjacent two of the cutout members. Thus, wasted regions depicted with hatching are wide. Further, as illustrated in FIG. 16, even when the piercing start points for every adjacent two of the cutout members are disposed between the both adjacent cutout members, a wide wasted region is still inevitably produced between the adjacent cutout members.

Figure 17:
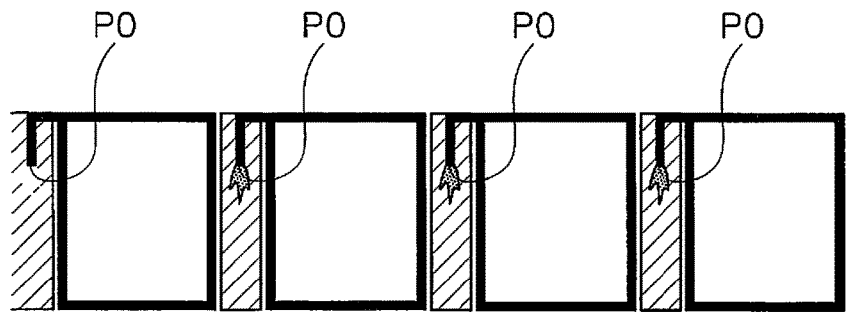
FIG. 17 is a diagram illustrating an exemplary product alignment where a piercing step is performed with use of the method of the present invention.
Figure 18:
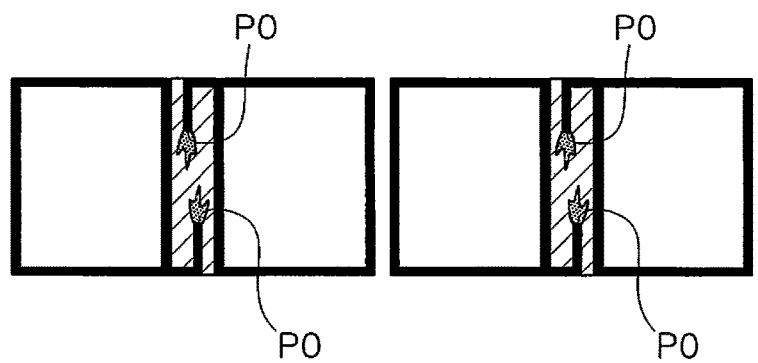
FIG. 18 is a diagram illustrating a product alignment where a piercing step is performed with use of the method of FIGS. 5 to 8.

By contrast, as illustrated in FIG. 17, the method according to the exemplary embodiment of the present invention can reduce the interval between every adjacent two of the cutout members in comparison with that of FIG. 15. Further, as illustrated in FIG. 18, where the piercing start points for every adjacent two of the cutout members are disposed between the both adjacent cutout members, a wasted region is much reduced.

Figure 19:
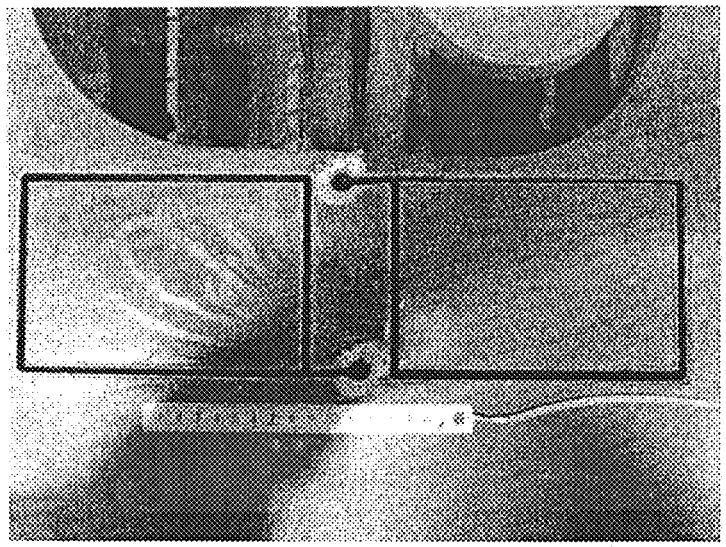
FIGS. 19A and 19B include comparative graphics showing difference in throughput yield between the well-known method and the method of the present invention.
Figure 19:
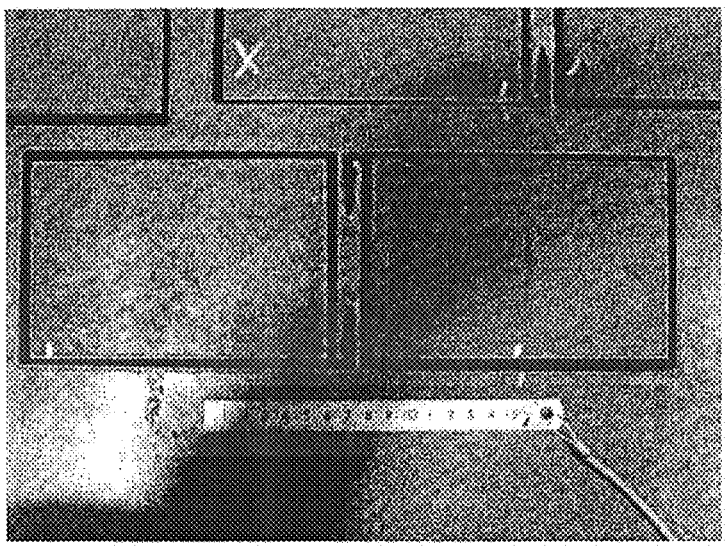

FIG. 19(a) shows an actual example where two rectangular cutout members were cut out with use of the well-known method, whereas FIG. 19(b) shows an actual example where similar cutout members were cut out with use of the method of the exemplary embodiment of the present invention. It should be noted that regarding the thickness of a plate blank and the power of plasma, the same conditions were applied to the both methods.

Figure 20:
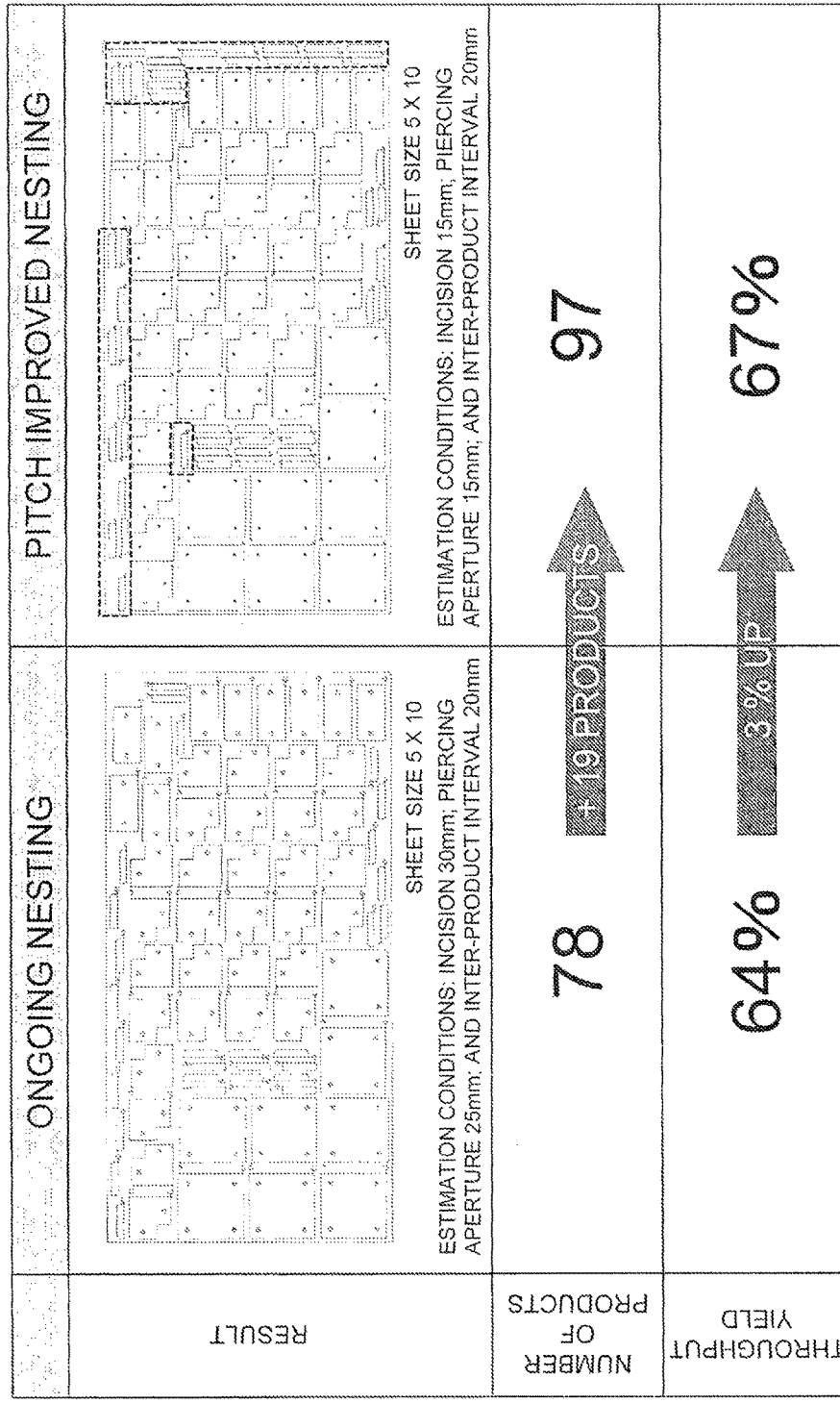
FIG. 20 is a diagram illustrating a comparative example between a product layout design according to the present invention and that according to the well-known method.

Further, FIG. 20 shows a comparison between the layout design (nesting) of cutout members (products) with use of the well-known method and the nesting of cutout members with use of the method according to the exemplary embodiment of the present invention.

As is obvious from FIG. 20, it is possible to remarkably improve a throughput yield by practicing the method of the present invention than by practicing the well-known method. Specifically, it is understood that in the method of the present exemplary embodiment, the number of products that can be cut out was increased by 19 while the throughput yield was improved from 64% to 67%. A typical user of a plasma cutting machine, cutting a large number of members on a daily basis, is supposed to cut a steel material as a plate blank by roughly 100 to 200 tons per month. When the throughput yield can be improved by 3%, such a user is supposed to be able to save the usage of the steel material by 3 to 6 tons per month. This leads to great improvement in material cost.

Features

In the piercing step, the height of the plasma start point P0 is set to be equal or roughly equal to the cutting height that is the distance between the plasma torch 3 and the plate blank where cutting is performed, or alternatively, is set to be the height that is closer to the plate blank than the cutting height and does not cause a double arc. Therefore, transition from a pilot arc to a main arc is enabled with a small pilot current. Further, transition from the pilot arc to the main arc can be smoothly performed; the degree of erosion and damage of the nozzle of the plasma torch 3 attributed to the pilot arc can be alleviated; and thus, the life of the nozzle can be extended.

To form a piercing aperture, the plasma torch is configured to be moved in the horizontal direction while being configured to be moved upward. The amount of sputter attaching to the plasma torch 3 can be thereby inhibited. Therefore, the interval between every adjacent two of a plurality of cutout members can be reduced, and a throughput yield can be improved. Further, reduction in life of the plasma torch can be inhibited.

In the piercing step, processing is performed under the same processing condition while the same height is maintained from the position P1 to the position P2. Therefore, a piercing aperture can be formed under the optimal processing conditions in accordance with conditions such as the material of and the thickness of the plate blank.

In the piercing step and the cutting step, the movement speed can be changed in accordance with conditions such as the thickness of the plate blank. Therefore, optimal cutting can be performed in accordance with conditions such as the sort of the plate blank and the shape of the cutout member.

In the piercing step, a piercing aperture is formed while the plasma torch is moved in a direction along the finally cut-out side of the cutout member. Hence, the incision part, provided between every adjacent two of the cutout members, can be compactly formed. Therefore, a throughput yield can be further improved.

In the piercing step, the upward movement speed of the plasma torch is set to be the fastest among the movement speeds in all the steps. Thus, attachment of sputter to the plasma torch can be further inhibited.

Other Exemplary Embodiments

The present invention is not limited to the exemplary embodiment as described above, and a variety of changes or modifications can be made without departing from the scope of the present invention.

In the aforementioned exemplary embodiment, the start point in the piercing step is set to be the position P0 located close to the plate blank. However, the start point in the piercing step may be set to be the position P1.

Figure 21:
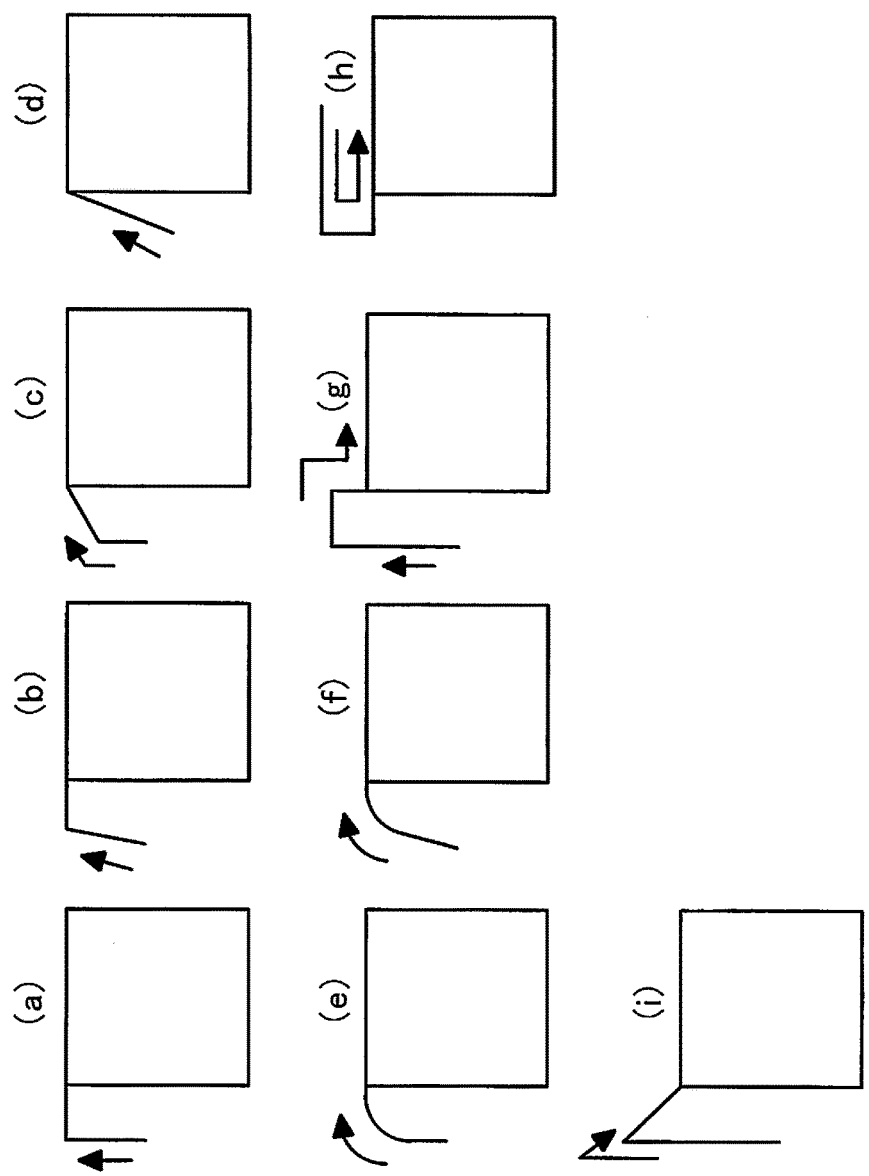
FIGS. 21(a)-21(i) include diagrams illustrating examples of the processing line with use of the method of the present invention.

The shape of the processing line in the incision part leading to the cutout member is not limited to that described in the aforementioned exemplary embodiment. FIGS. 21(a)

to 21(i) illustrate modifications in addition to the processing line in the aforementioned exemplary embodiment.

It should be noted that FIGS. 21(a), 21(b), 21(e), 21(f) and 21(h) are preferable for smooth and continuous transition from the incision part to the firstly cut-out side of the cutout member. On the other hand, FIGS. 21(a), 21(c), 21(d) and 21(e) are preferable from the perspective of improvement in throughput yield.

In the plasma cutting method and device of the present invention, it is possible to improve a throughput yield in cutting out a plurality of cutout members from a plate blank. Especially, it is possible to improve a throughput yield that is to be reduced due to a piercing step.

The invention claimed is:

1. A plasma cutting method of cutting out a plurality of cutout members from a plate blank by a plasma arc generated from a plasma torch, comprising:
  a piercing step of forming an aperture on an outer peripheral side of a given one of the cutout members by maintaining the plasma torch at a first height from the plate blank on the outer peripheral side of the given cutout member while the plasma arc is being generated from the plasma torch and by moving the plasma torch relative to the plate blank by a predetermined distance in a horizontal direction; and
  a cutting step of forming a continuous cutting groove along an outer contour of the given cutout member by setting the plasma torch at a second height lower than the first height and by moving the plasma torch in the horizontal direction along an incision part and a processing line continuing to the incision part,
  in the piercing step, the plasma torch being set at a height lower than the first height when the plasma arc begins to be generated, and then moved in the horizontal direction while being moved, in an upward direction to the first height.

2. The plasma culling method recited in claim 1, wherein a movement speed of the plasma torch in the piercing step and a movement speed of the plasma torch in the cutting step are separately settable.

3. The plasma cutting method recited in claim 2, wherein in the piercing step, the plasma torch is configured to be moved in a direction along a finally cut-out one of sides of the given cutout member.

4. The plasma cutting method recited in claim 1, wherein in the piercing step, the plasma torch is configured to be moved in a direction along a finally cut-out one of sides of the given cutout member.

5. The plasma cutting method recited in claim 1, wherein an upward movement speed of the plasma torch in the piercing step is set to be the fastest among movement speeds in all the steps.

6. A plasma cutting device configured to cut out a plurality of cutout members from a plate blank, comprising:
  a mount table onto which the plate blank to be cut is mounted;
  a plasma torch configured to generate a plasma arc and movable relative t the F fount table in, a horizontal direction and in an up-and-down direction; and
  a controller programmed to control movement of the plasma torch relative to the mount table and generation of the plasma arc from the plasma torch, wherein
  the controller is programmed to
    receive a set data regarding a processing line;
    form an aperture on an outer peripheral side of a given one of the cutout members by maintaining the plasma torch at a first height from the plate blank on the outer peripheral side or the given cutout member while the plasma arc is, being generated from the plasma torch and by moving the plasma torch relative to the plate blank by a predetermined distance in the horizontal direction; and
    form a continuous cutting groove along an outer contour of the given cutout member by setting the plasma torch at a second height lower than the first height and by moving the plasma torch in the horizontal direction along an incision part and the processing line continuing to the incision part,
  the controller being further programmed to set the plasma torch at a position lower than the first height when the plasma arc begins to be generated, and to then move the plasma torch in the horizontal direction and simultaneously in an upward direction to the first height.

7. The plasma cutting device recited in claim 6, wherein the controller is capable of separately setting a movement speed of the plasma torch when forming the aperture and a movement speed of the plasma torch when forming the continuous cutting groove.

8. The plasma cutting device recited claim 7, wherein the controller is programmed to move the plasma torch in a direction along a finally cut-out one of sides of the given cutout member on a basis of the set of data.

9. The plasma cutting device recited in claim 6, wherein the controller is programmed to move the plasma torch in a direction along a finally cut-out one of sides of the given cutout member on a basis of the set of data.

\* \* \* \* \*